Figure 1:
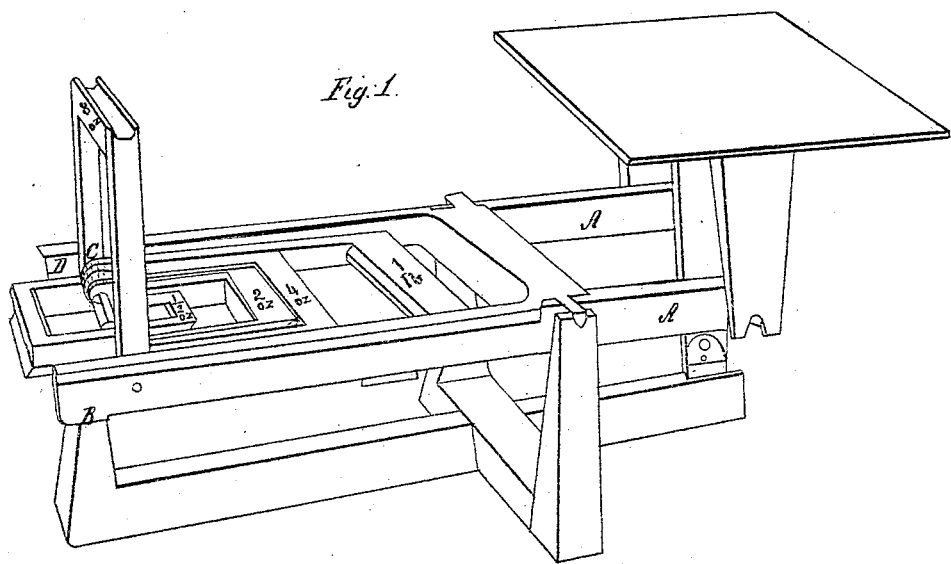

S. HARRIS.
Balance Weight.

No. 60,184.

Patented Dec. 4, 1866.

United States Patent Office.

IMPROVEMENT IN BALANCE WEIGHTS.

SANDY HARRIS, OF PHILADELPHIA, PENNSYLVANIA, ASSIGNOR TO C. THORNTON MURPHY, OF SAME PLACE.

Letters Patent No. 60,184, dated December 4, 1866.

SPECIFICATION.

TO ALL WHOM IT MAY CONCERN:

Be it known that I, SANDY HARRIS, of Philadelphia, in the county of Philadelphia, in the State of Pennsylvania, have invented a new and improved mode of constructing and Attaching Weights to Balances for weighing purposes; and I do hereby declare that the following is a full and exact description thereof, reference being had to the accompanying drawings, and to the letters of reference marked thereon.

The nature of my invention consists in substituting for the weights usually employed in scales or balances a number of what I have termed lever weights, attached to and of course forming a part of the balance itself. The construction and operation of these I will now proceed to explain, so that others skilled in the art can make and use them.

I make my balance in any of the known forms, except as to that part extending outward from the fulcrum or knife-heads, for the weights to act upon. This I form by extending outward from the knife-heads two parallel beams A A, fig. 1 in the drawings, with a connection at B, fig. 1, near their outer extremities. This connection is at the bottom, and forms the bearing of the weights, which, it will be seen as I proceed, open and shut between the beams. The length, distance apart, and depth of these beams, being made in reference to the capacity which it is intended to give the balance, I proceed to form the weights. The beams, with the part of the balance from which they project, form a sort of flat box, with two sides and one end, the sides and end forming a figure something like the letter U, except that the corners are right angles instead of round. The weights are made of the same shape, except that the weight is given to the end, the sides having no more than is necessary to enable them to support the given weight. The first and largest weight I make to fall in and fit between the beams, but with sides, two inches shorter than the beams. The next weight is made to fall in between the sides of the first, and so on down to the smallest. The disconnected ends of these weights are on a line, and are then made to work on a rivet passing through both sides of each, and also through both the beams, at a point, say an inch from their outer ends. Though the sides of these weights fit close together, as seen at C, fig. 1, their ends have a space between them for the convenience of handling. The ends of these weights I make with a groove in them, for the convenience of filing, when the work of balancing is entered upon. The size or weight given to each of these I determine in reference, first, to what I desire them to balance, and then to the distance which their sides will throw them when opened out. After this a more correct balance is easily procured by filing. The denomination of each weight is then marked permanently on it, on both sides, and in such direction as to read right in either position of the weight. So formed and arranged, the weights lie level in the box or space between the beams, and the heavy ends, being next the knife-heads, are made to balance the scale preparatory to weighing. For use, they are then simply opened out, like the blade of a knife, resting on that part of the bearing which projects outward, with the beams say an inch from the rivet, as is seen at D, fig. 1. These weights, as well as the balances to which they may be attached, may be made of brass, iron, or other suitable material. The weights are easily kept clean by slipping a case over them; and being always in place, are used with great convenience, and, by one familiar with his balance, in the dark as well as light.

What I claim as my invention, and desire to secure by Letters Patent, is—

Combining the lever weights with the scale beam in the manner described.

SANDY HARRIS.

Witnesses:
G. BRUORTON,
M. HARRIS.